United States Patent
Mardjono et al.

(10) Patent No.: US 11,111,808 B2
(45) Date of Patent: Sep. 7, 2021

(54) COATING WITH PROPERTY GRADIENT FOR INNER WALL OF TURBOMACHINE

(71) Applicant: SAFRAN AIRCRAFT ENGINES, Paris (FR)

(72) Inventors: Jacky Novi Mardjono, Moissy-Cramayel (FR); Arnaud Dubourg, Montreal (CA); Edith-Roland Fotsing, Montreal (CA); Annie Ross, Montreal (CA)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/770,416

(22) PCT Filed: Dec. 6, 2018

(86) PCT No.: PCT/FR2018/053128
§ 371 (c)(1),
(2) Date: Jun. 5, 2020

(87) PCT Pub. No.: WO2019/110934
PCT Pub. Date: Jun. 13, 2019

(65) Prior Publication Data
US 2020/0386113 A1 Dec. 10, 2020

(30) Foreign Application Priority Data

Dec. 6, 2017 (CA) .................................. CA2988224
Dec. 6, 2017 (FR) ....................................... 1761722

(51) Int. Cl.
*F01D 11/12* (2006.01)
*F01D 25/24* (2006.01)
*B33Y 80/00* (2015.01)

(52) U.S. Cl.
CPC ............ *F01D 11/122* (2013.01); *F01D 25/24* (2013.01); *B33Y 80/00* (2014.12); *F05D 2230/90* (2013.01);
(Continued)

(58) Field of Classification Search
CPC ....... F01D 11/122; F01D 25/24; B33B 5/028; B33B 5/12; B33B 5/16; B33B 7/02;
(Continued)

(56) References Cited

U.S. PATENT DOCUMENTS 6,059,524 A * 5/2000 Costa ..................... F01D 21/045
415/9
6,767,619 B2 * 7/2004 Owens .................. B29B 15/122
428/304.4
(Continued)

FOREIGN PATENT DOCUMENTS

FR 2 996 874 A1 4/2014

OTHER PUBLICATIONS

International Search Report dated Mar. 8, 2019 in PCT/FR2018/053128 filed on Dec. 6, 2018, 2 pages.

*Primary Examiner* — Igor Kershteyn
(74) *Attorney, Agent, or Firm* — Oblon, McClelland, Maier & Neustadt, L.L.P.

(57) ABSTRACT

A property gradient coating to be applied by additive manufacture to an inner wall of a casing mounted on the periphery of moving blades of a turbomachine rotor, the coating including in superimposed layers from an outer surface of the coating to this inner wall of the casing, on the one hand, a first layer consisting of a three-dimensional scaffolding of filaments of an abradable material forming an ordered network of channels or microchannels whose pore sizes are between 50 and 250 microns and whose porosity is greater than 85%, and, on the other hand, a second layer having a
(Continued)

function of dissipating energy from acoustic waves striking the outer surface of the coating and consisting of a three-dimensional scaffolding of filaments of a first thermosetting material forming an ordered network of channels or microchannels whose pore sizes are between 50 and 400 microns and whose porosity is greater than 60%.

13 Claims, 3 Drawing Sheets

(52) U.S. Cl.
CPC ............ *F05D 2300/6031* (2013.01); *F05D 2300/611* (2013.01); *F05D 2300/6111* (2013.01)

(58) Field of Classification Search
CPC .......... B33B 2307/554; B33B 2307/56; B33B 2307/102; B33B 2307/726; B33B 2605/18; B33B 2262/02; B33B 2603/00; B33B 2250/20; B32Y 80/00; F05D 2230/90; F05D 2300/6031; F05D 2300/611; F05D 2300/6111

See application file for complete search history.

(56) References Cited

U.S. PATENT DOCUMENTS

| | | | |
|---|---|---|---|
| 7,445,421 B2 * | 11/2008 | Sathianathan | F01D 21/045 415/200 |
| 8,333,558 B2 * | 12/2012 | Finn | F01D 21/045 415/200 |
| 8,403,624 B2 * | 3/2013 | Xie | B29C 70/086 415/9 |
| 9,624,789 B2 * | 4/2017 | Webster | F04D 29/668 |
| 9,957,826 B2 * | 5/2018 | Novikov | C10M 109/00 |
| 2004/0022625 A1 | 2/2004 | Care | |
| 2005/0201860 A1 | 9/2005 | Care | |
| 2005/0265826 A1 | 12/2005 | Care | |
| 2015/0267544 A1 | 9/2015 | Santanach et al. | |

\* cited by examiner

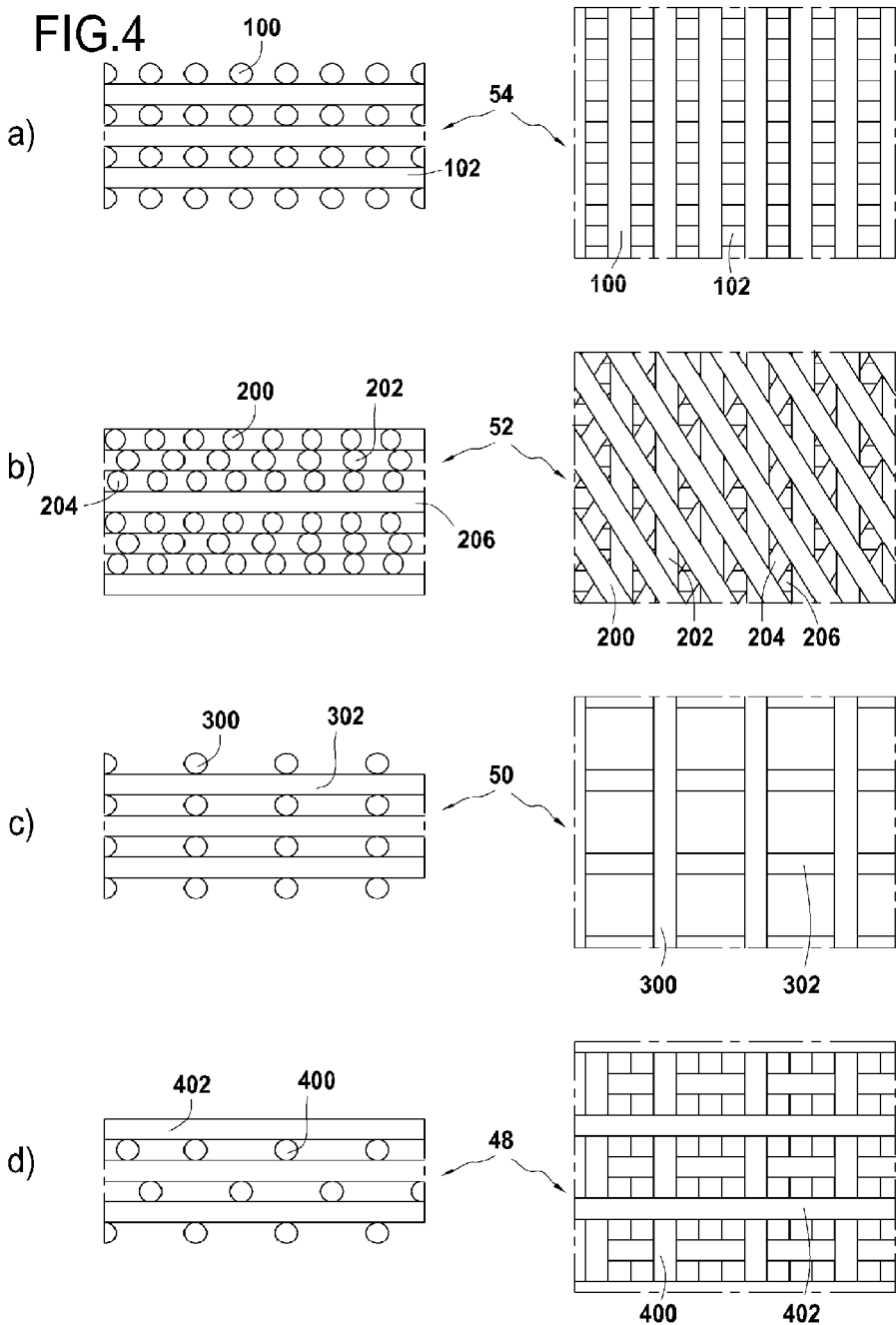

COATING WITH PROPERTY GRADIENT FOR INNER WALL OF TURBOMACHINE

BACKGROUND OF THE INVENTION

The present invention relates to the general field of the manufacture of parts made of polymeric materials, in particular thermosetting materials, of metal, metal alloy or ceramic parts by additive manufacture and it relates more particularly, but not exclusively, to the manufacture of abradable coatings having acoustic functionalities, in particular for fan casings.

The control of aircraft noise around airports has become a public health issue. Increasingly stringent standards and regulations are being imposed on aircraft manufacturers and airport managers. As a result, building a quiet aircraft has become a strong selling point over the years. Currently, the noise generated by aircraft engines is attenuated by localized acoustic coatings that reduce the engine's sound intensity over one or two octaves on the principle of Helmholtz resonators. These coatings are classically in the form of composite panels consisting of a rigid plate combined with a honeycomb core covered with a perforated skin and arranged at the nacelle or upstream and downstream propagation ducts. However, in new engine generations (for example in turbofan engines), the areas available for acoustic coatings are likely to be considerably reduced, as in ultra-high bypass ratio (UHBR) technology. In addition, these areas of composite casings are likely to have shape defects that need to be made up by an additional machining operation before the coating is applied.

It is therefore important to propose new processes and/or new materials (in particular porous materials) for eliminating or significantly reducing the noise level generated by aircraft engines, especially during take-off and landing phases and over a wider frequency range than currently including low frequencies, while maintaining engine performance. This is why new noise reduction technologies are now being sought to reduce this nuisance as well as new acoustic treatment surfaces with minimal impact on other engine functionalities such as specific fuel consumption, which is a major commercial advantage.

However, in aircraft engines, fan noise is one of the main contributors to noise pollution, encouraged by the increase in the bypass ratio sought by these new generations of aircraft.

In addition, it is now common and advantageous to use additive manufacturing processes instead of traditional casting, forging or mass machining to produce complex three-dimensional parts easily, quickly and cost-effectively. The aeronautical field is particularly well suited to the use of these processes. One example is the wire beam deposition (WBD) process.

SUBJECT MATTER AND SUMMARY OF THE INVENTION

The present invention aims to propose a new coating for significantly reducing the noise generated by aircraft turbojets and in particular that generated by the fan-OGV assembly. One of the purposes of the invention is also to make up for the shape defects resulting from the composite nature of the inner wall of the casings to which this coating is intended to be applied.

For this purpose, there is provided a coating with a property gradient intended to be applied by additive manufacture to an inner wall of a casing mounted on the periphery of moving blades of a turbomachine rotor, characterized in that it comprises superimposed layers of an outer surface of said coating on said casing inner wall:

a first layer consisting of a three-dimensional scaffolding of filaments of an abradable material forming an ordered network of channels or microchannels with pore sizes between 50 and 250 microns and a porosity greater than 85%, and a second layer having a function of dissipating energy from acoustic waves striking said outer surface of said coating and consisting of a three-dimensional scaffolding of filaments of a first thermosetting material forming an ordered network of channels and/or microchannels whose pore sizes are between 50 and 400 microns and whose porosity is greater than 60%.

The result is a porous microstructure with regular and orderly porosity whose properties can be perfectly controlled throughout the entire thickness of the coating. Depending on the layers used, radial aerodynamic losses are limited, fluid retention is reduced, and sound and ballistic absorption is maximized.

Preferably, the filaments of said first layer are alternately oriented at 0° or 90° without any offset in the superposition of filaments having the same direction of orientation and the filaments of said second layer are alternately oriented with a direction of orientation of the filaments offset or not by the same angular deviation, typically between 20° and 40°.

According to the embodiment envisaged, the coating may also include a layer of a clearance compensation material deposited directly on said inner casing wall to obtain a deposition surface of known geometry.

According to the embodiment envisaged, the coating may also include a third layer having a drainage function for the fluids passing through said coating and consisting of a three-dimensional scaffolding of filaments of a second thermosetting material forming an ordered network of channels or microchannels whose pore sizes are greater than 250 microns and whose porosity is greater than 70%.

Preferably, said third layer comprises specific patterns with channels directing the evacuation of fluids passing through said coating to specific areas and having a channel size greater than 500 microns.

Advantageously, the filaments of said third layer are alternately oriented at 0° or 90° without any offset in the superposition of filaments having the same direction of orientation.

According to the embodiment envisaged, the coating may also include a fourth layer with a ballistic energy absorption function resulting from a volatile impact, hail ingestion, or even blade loss and consisting of a three-dimensional scaffolding of filaments of a third thermosetting material forming an ordered network of channels or microchannels with pore sizes of less than 400 microns and a porosity of less than 60%.

Preferably, the filaments of said fourth layer are alternately oriented at 0° or 90° and have an offset in the superposition of filaments having the same direction of orientation.

Advantageously, the coating may further comprise at least one additional layer of an abradable material added locally on said first layer to take into account a non-axisymmetric geometry of said casing.

Preferably, said abradable material is a solvent-free thixotropic mixture consisting of a polymer base and a cross-linking agent in a weight ratio of polymer base to cross-linking agent of between 1:1 and 2:1, and a flow facilitating component, typically a petroleum jelly present between 5 and 15% by weight of the total weight of said thixotropic mixture.

Advantageously, said first, second and third thermosetting materials consist of said abradable material.

Preferably, said casing is a turbomachine fan casing made of woven composite material.

BRIEF DESCRIPTION OF THE DRAWINGS

Other features and advantages of the present invention will be apparent from the detailed description given below, with reference to the following figures, which are non-limiting, and wherein.

DETAILED DESCRIPTION OF THE INVENTION

Figure 1:
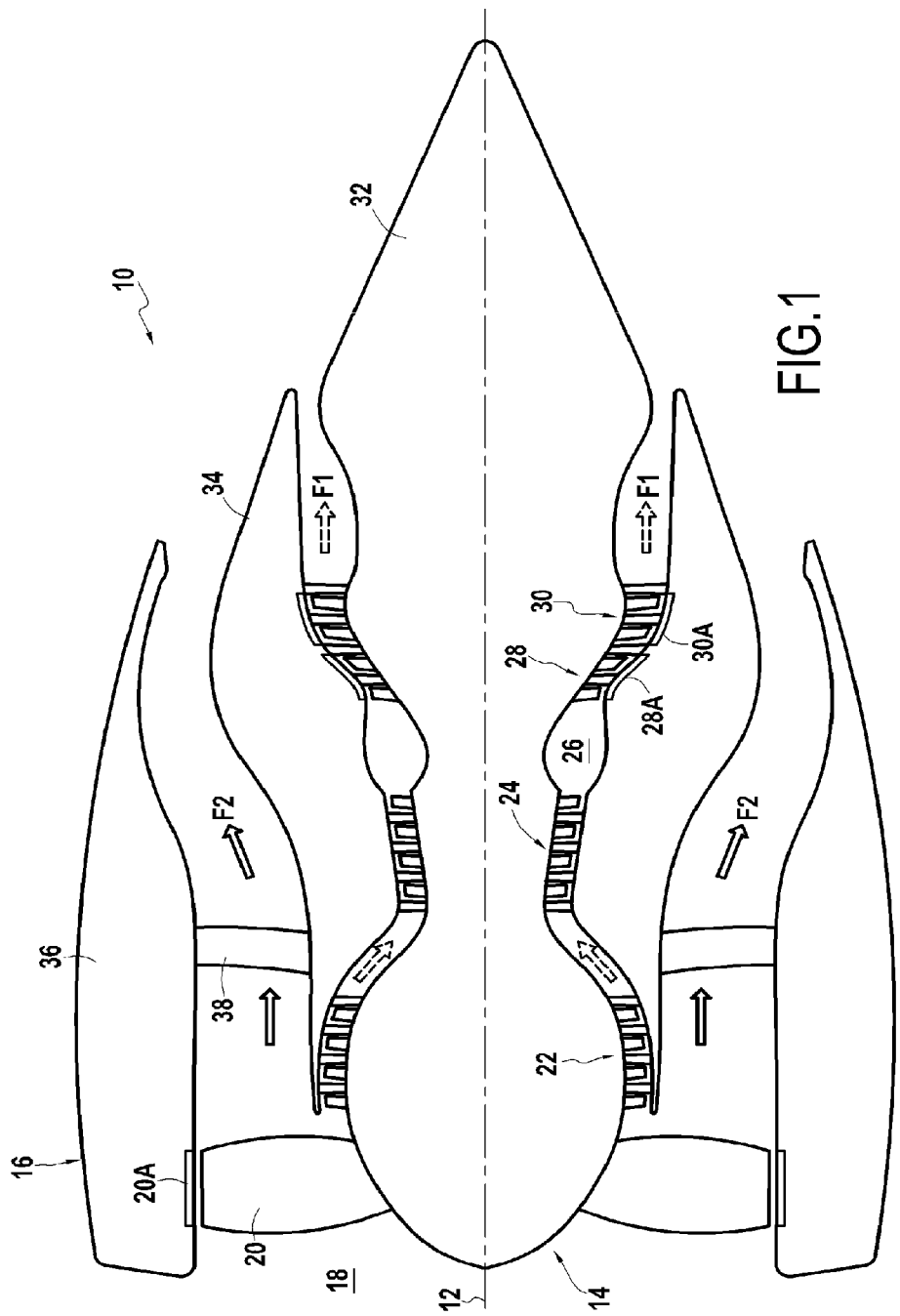
FIG. 1 schematically illustrates an aircraft turbomachine architecture in which the property gradient coating of the invention is implemented.

FIG. 1 is a highly schematic view of an aircraft turbomachine architecture, in this case a turbofan engine, to one wall of which a property gradient coating according to the invention is applied.

Classically, such a turbofan engine 10 has a longitudinal axis 12 and consists of a gas turbine engine 14 and an annular nacelle 16 centered on the axis 12 and arranged concentrically around the engine.

From upstream to downstream, depending on the direction of flow of an air or gas stream passing through the turbojet engine, the engine 14 comprises an air inlet 18, a fan 20, a low-pressure compressor 22, a high-pressure compressor 24, a combustion chamber 26, a high-pressure turbine 28 and a low-pressure turbine 30, each of these elements being arranged along the longitudinal axis 12. The gases produced by the engine are ejected through a nozzle consisting of an annular central body 32 centered on the longitudinal axis 12, an annular primary cowl 34 coaxially surrounding the central body to delimit with the latter an annular flow channel for the primary flow F1, and an annular secondary cowl 36 coaxially surrounding the primary cowl in order to delimit therewith an annular flow channel for the secondary flow F2 coaxial to the primary flow channel and in which straightening vanes 38 are arranged (in the illustrated example embodiment, the nacelle 16 of the turbojet engine and the secondary cowl 36 are one and the same part). The primary and secondary cowls include, in particular, the turbine intermediate casings 28A and 30A surrounding the turbine rotor blades and the fan casing 20A surrounding the fan rotor blades.

According to the invention, it is proposed to apply, by additive manufacture, to the inner walls of casings facing rotor blades, a property gradient coating in the form of a three-dimensional scaffolding of filaments of a thermosetting material forming between them an ordered network of channels. Depending on the envisaged network configuration, interconnections between the channels can exist in a regular manner when superimposing the different layers of the coating intended to generate these different channels. This wall is preferentially a wall of a turbomachine, such as an aircraft turbojet engine, mounted on the immediate periphery of the rotor blades and more particularly the inner wall of the fan casing 20A made of woven composite, preferentially 3D, arranged on the periphery of the fan blades. However, a deposit on the turbine casing(s) 28A, 30A can also be envisaged, provided of course that the thermosetting material on a metal or ceramic base has properties adapted to the high-temperature environment to which it is then subjected.

Figure 2:
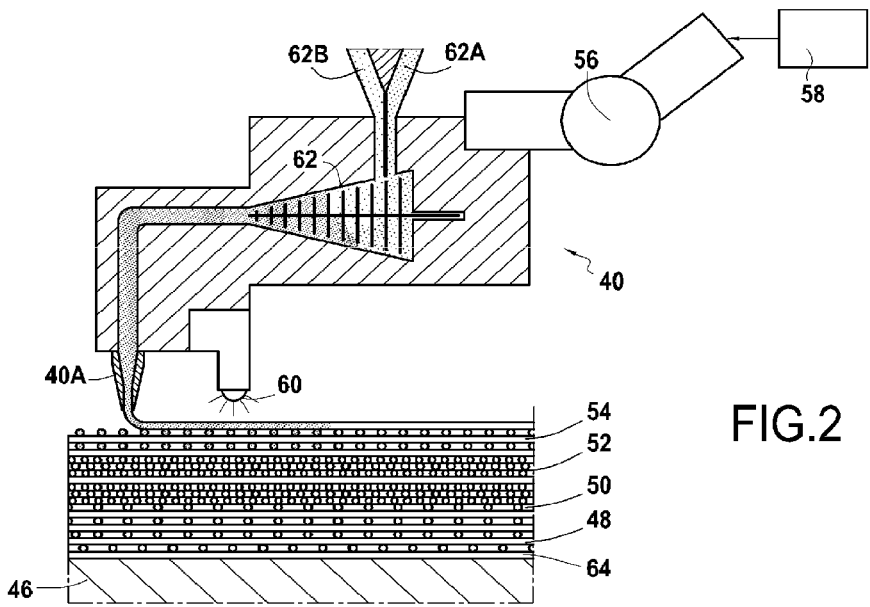
FIG. 2 illustrates a filamentary material deposition system used for the manufacture of the coating of the invention.

FIG. 2 is a schematic representation of an example of a filamentary material deposition system 40 for fabricating the property gradient coating of the invention. A property gradient material is defined as a material which involves both a regular variation free of discontinuities (example embodiment not described) and a stacking of several distinct layers with different properties (example embodiment of the invention).

The purpose of this filamentary deposition system is to deposit, preferably in conjunction with a pressure and temperature control circuit internal to the system, the thermosetting material by extrusion via an ejection nozzle 40A of calibrated shape and size firstly on the substrate 46 and then successively on the various superimposed layers created 48, 50, 52, 54, each having, due to their distinct structures, a different property, until the desired thickness for this coating is obtained.

The filament deposition system 40 follows a deposition path printed by a controlled mechanical assembly 56, typically a multi-axis (at least 3-axis) machine or preferentially a robot, which is controlled by a management unit 58, typically a microcontroller or microcomputer, to which it is connected ensuring the control of the filament deposition system and controlling at any point of the treated surface both the filament arrangement and the porosity of the coating obtained. A heating lamp or other similar element 60, mounted close to the ejection nozzle 40A, may be used to stabilize the deposited material and prevent creep during deposition.

The thermosetting material is fed from a conical extrusion screw 62, which allows several components to be mixed to form a thixotropic paste-like fluid. The conical extrusion screw ensures an adequate and homogeneous mixing of the components (throughout the deposition operation), to obtain a fluid material with a high viscosity which will be deposited by the calibrated nozzle. During this operation, the generation of air bubbles must be avoided which form so many defects in the printed filament and instability in the flow of the fluid material must be avoided; it is therefore necessary to push the material very gradually. It should be noted that with such a conical extrusion screw the change of constitution of the thermosetting material deposited and forming the different layers 48-54, can be easily achieved by a simple control of the different components successively introduced into the conical extrusion screw which has at least two separate inlets 62A, 62B for the simultaneous introduction of at least two components.

Figure 3:
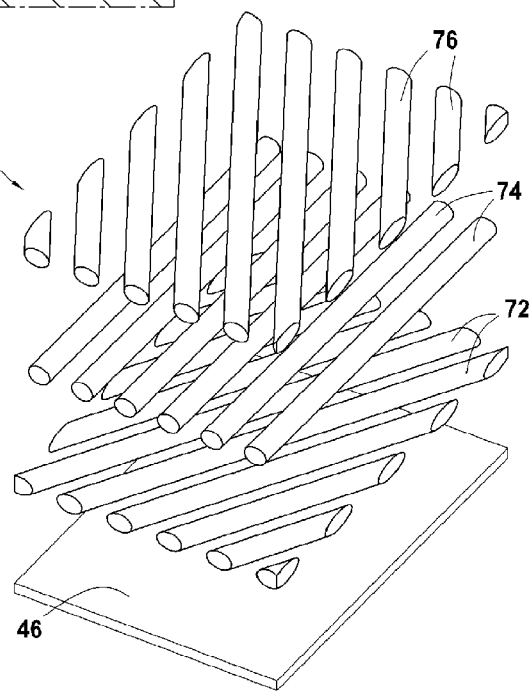
FIG. 3 is an exploded view of a three-dimensional filament scaffold obtained by the system in FIG. 2, and FIGS. 4A to 4D show an example of the different layers of the property gradient coating of the invention.

FIG. 3 illustrates in exploded view a small part of a three-dimensional scaffolding 70 of filaments 72, 74, 76, advantageously cylindrical, of thermosetting material allowing the coating of the invention to be made in the form of an ordered network of channels (micro-trellis) of such a nature as to confer the desired property gradient through the superimposed layers of this coating.

Indeed, and as shown by the different configurations of FIGS. 4A, 4B, 4C and 4D, the coating of the invention is formed by the superposition by additive manufacture, from the inner wall of the casing to the outer surface, of different layers of material each having a given thickness and a distinct structure giving each of them a different property. Each layer of this coating, printed from the aforementioned filamentary deposition system, consists of a three-dimensional scaffolding of filaments of thermosetting material forming an ordered network of channels.

FIG. 4A shows a three-dimensional scaffold of filaments 100, 102 intended to form the outer layer 54 of the coating and consisting of superimposed layers of filaments in which the filaments of a given layer are alternately oriented at 0° or 90° without any offset in the superimposition of filaments having the same direction of orientation.

The purpose of this first layer 54 is to ensure the abradability of the coating when the moving blades pass through (in particular during engine running-in) while satisfying the aerodynamic conditions of the turbomachine. To do this, the thermosetting material used for this first layer is an abradable material in the thickness of which are formed specific patterns having porosities (percentage of void) dimensioned to allow the passage or dissipation of aerodynamic fluctuations (or their modifications) and/or acoustic waves. Typically, a porosity greater than 85% for a filament size between 50 and 250 microns is suitable for this abradability function. These patterns may also consist of perforations or grooves with dimensions less than 1.5 mm, which also improve aerodynamic margins.

The advantage of this abradability function on the surface layer of the coating is to make the rotor-casing assembly compatible with the deformations that the rotating moving blades undergo when they are subjected to the sum of the aerodynamic and centrifugal forces.

Abradable material refers to the capacity of the material to dislocate (or erode) in operation in contact with an opposing part (low shear resistance) and its resistance to wear following the impact of particles or foreign bodies that it is forced to ingest during operation. Such a material must also retain or even promote good aerodynamic properties, have sufficient oxidation and corrosion resistance and a coefficient of thermal expansion of the same order as the layer or substrate on which it is deposited, in this case the woven composite material forming the casing walls.

FIG. 4B shows a three-dimensional scaffold of filaments 200, 202, 204, 206 intended to form the layer 52 of the coating and consisting of layers of superimposed filaments having a direction of filament orientation which may or may not be offset by the same angular deviation, for example between 20° and 40° (this inclination value is not intended to be limiting), at each layer.

The purpose of this second layer 52 on which the first layer 54 is deposited is to ensure the dissipation of the energy of the acoustic wave. To do this, the three-dimensional scaffolding can have channels or microchannels with pore sizes typically between 50 and 400 microns and porosity greater than 60%. It is not necessary that the thermosetting material used for the manufacture of this second layer 52 be the abradable material used by the first layer 54. However, it is possible to use the same material for the whole coating and avoid having to change its composition between each layer.

This second layer 52 must, of course, withstand the mechanical and environmental constraints related in particular to particle impacts and maintain the aerodynamic performance of the turbomachine.

FIG. 4C shows a three-dimensional scaffold of filaments 300, 302 to form the third layer 50 of the coating, consisting of superimposed layers whose filaments are oriented alternately at 0° or 90° with no offset between layers having the same direction of orientation of the cylindrical filaments, as in the three-dimensional scaffold of the first layer 54, but with a greater spacing between the filaments, of the order of 2 times greater in the example shown. Typically, a porosity greater than 70% for a filament size greater than 250 microns is suitable for this drainage function.

The thermosetting material used in the manufacture of this third layer 50 may or may not be the abradable material used by the first layer 54 and may or may not be different from that used in the manufacture of the second layer 52.

The purpose of this third layer 50 on which the second layer 52 is deposited is to ensure the drainage of fluids ingested by the turbomachine and passing through the coating. In order to do this, this layer with a drainage function will advantageously have specific patterns with channels directing the evacuation of fluids towards favorable areas (drains located at 6 o'clock from the flow) and having a channel size greater than 500 microns.

Like the second layer 52, this third layer 50 must withstand the mechanical and environmental constraints relating in particular to particle impacts and maintain the aerodynamic performance of the turbomachine.

It should be noted that the presence of this third layer 50 is not necessarily required, as the drainage function can be advantageously ensured by adding a layer with hydrophobic properties located under the first layer 54.

FIG. 4D also shows a three-dimensional scaffolding of filaments 400, 402 intended to form the fourth and last layer 48 of the coating and consisting of superimposed layers in which the filaments of a given layer are alternately oriented at 0° or 90° and have an offset in the superimposition of filaments having the same direction of orientation. This offset is, as illustrated, preferably equal to half the distance between two filaments. Typically, a porosity of less than 60% for a filament size of less than 400 microns is suitable for performing this ballistic function.

The thermosetting material used in the manufacture of this fourth layer 48 may or may not be the abradable material used by the first layer 54 and may or may not be different from that used in the manufacture of the second 52 or third 50 layers.

The purpose of this last layer 48 deposited on the casing 46 and on which the third layer 50 is itself deposited is to reinforce the mechanical strength of the entire coating and to allow the absorption of ballistic energy resulting from a volatile impact or hail ingestion or even loss of blade. This last layer must also withstand the mechanical and environmental stresses related in particular to particle impacts.

It should be noted that, as with the third layer 50, the presence of the latter layer 48 is not necessarily required, as the energy absorption function can be advantageously provided within the acoustic layer 52 or directly by the casing 46.

For all these layers, it is necessary to ensure adhesion to the previous layer and/or the next layer which may be directly the casing (compatibility of the coefficients of thermal expansion of the different layers and in particular that of the casing material).

It should be noted that an additional interface layer 64 (see FIG. 2) may be added prior to the production of these three-dimensional filament scaffolds. This is because the fan casing is a woven composite casing whose three-dimensional geometry generally shows deviations (shape defects) from the calculated ideal surface, due in particular to the tendency to form lobes as a result of the weaving process used (typically poly-flex type). The correction of these defects currently involves complex and costly operations. It is therefore possible with the device to deposit a material to make up for play (resin or other) in order to obtain a known geometry. The advantage of this preliminary step is to return to a controlled deposition surface, precisely defined and meeting the shape constraints necessary to ensure good aerodynamic clearances in the engine area of the turbomachine.

It should also be noted that additional layers of abradable material can be added locally on the first layer 54 to ensure the axisymmetry of the outer surface of the coating. This is because fan casings often have a non-axisymmetric geometry.

The abradable material extruded from the calibrated nozzle(s) is advantageously a high viscosity thermosetting material (also called fluid) which is free of solvents whose evaporation generates a strong shrinkage as is known. This material is preferably a resin with slow polymerization kinetics and stable filament flow in the form of a thixotropic mixture which therefore has the advantage of a much lower shrinkage between the printing on the substrate (just after extrusion of the material) and the final structure (once heated and polymerization complete).

An example of abradable material used in the context of the process of the invention is a material in paste form consisting of three components, namely a polymer base, for example epoxy resin (in the form of a blue modeling clay), a cross-linking agent or accelerator (in the form of a white modeling clay) and a translucent colored petroleum jelly (for example Vaseline™). The accelerator/base components are distributed in a weight ratio of base to accelerator of between 1:1 and 2:1 and the petroleum jelly is present between 5 and 15% (typically 10%) by weight of the total weight of the material. The base may further include hollow glass microspheres of a determined diameter to ensure the desired porosity while allowing the mechanical performance of the printed scaffolding to be increased. The advantage of introducing petroleum jelly lies in the reduction of the viscosity of the resin as well as the reaction kinetics of the abradable, which makes its viscosity more stable during the printing process and thus facilitates the flow of the material (the viscosity is directly related to the extrusion pressure required to ensure adequate extrusion speed to maintain the quality of the print).

By way of example, such a ratio of 2:1 gives an abradable material comprising 0.7 g accelerator and 1.4 g base, to which 0.2 g petroleum jelly should be added.

For layers other than the first layer 54 and where the thermosetting material used for all three-dimensional filament scaffolding is not the abradable material, a metal or ceramic-based material may be validly used.

Thus, the present invention allows a fast and stable printing allowing the efficient reproduction of high-performance structures with predefined functions and controlled features (roughness, aspect, opening rate) having a small filament size and a low weight which are particularly advantageous in view of the strong constraints encountered in aeronautics.

The invention claimed is:

1. A property gradient coating intended to be applied by additive manufacture to an inner wall of a casing mounted on the periphery of moving blades of a turbomachine rotor, comprising superimposed layers of an outer surface of said coating on said casing inner wall:
   a first layer consisting of a three-dimensional scaffolding of filaments of an abradable material forming an ordered network of channels or microchannels with pore sizes between 50 and 250 microns and a porosity greater than 85%, and
   a second layer having a function of dissipating energy from acoustic waves striking said outer surface of said coating and consisting of a three-dimensional scaffolding of filaments of a first thermosetting material forming an ordered network of channels or microchannels with pore sizes between 50 and 400 microns and porosity greater than 60%.

2. The property gradient coating as claimed in claim 1, wherein the filaments of said first layer are alternately oriented at 0° or 90° without any offset in the superposition of filaments having the same direction of orientation.

3. The property gradient coating as claimed in claim 1, wherein the filaments of said second layer are alternately oriented with a direction of orientation of the filaments offset or not by the same angular deviation, between 20° and 40°.

4. The property gradient coating as claimed in claim 1, wherein the coating further comprises a layer of a clearance compensating material deposited directly on said inner casing wall to obtain a deposition surface of known geometry.

5. The property gradient coating as claimed in claim 1, wherein the coating further comprises a third layer having a function of draining fluids passing through said coating and consisting of a three-dimensional scaffolding of filaments of a second thermosetting material forming an ordered network of channels or microchannels whose pore sizes are greater than 250 microns and whose porosity is greater than 70%.

6. The property gradient coating as claimed in claim 5, wherein said third layer has specific patterns with channels directing the evacuation of fluids passing through said coating to determined areas and having a channel size greater than 500 microns.

7. The property gradient coating as claimed in claim 6, wherein the filaments of said third layer are alternately oriented at 0° or 90° without any offset in the superposition of filaments having the same direction of orientation.

8. The property gradient coating as claimed in claim 1, wherein the coating further comprises a fourth layer having a function of absorbing ballistic energy resulting from a volatile impact, hail ingestion, or even blade loss and consisting of a three-dimensional scaffolding of filaments of a third thermosetting material forming an ordered network of channels or microchannels whose pore sizes are less than 400 microns and whose porosity is less than 60%.

9. The property gradient coating as claimed in claim 8, wherein the filaments of said fourth layer are alternately oriented at 0° or 90° and have an offset in the superposition of filaments having the same direction of orientation.

10. The property gradient coating as claimed in claim 1, wherein the coating further comprises at least one additional layer of an abradable material added locally on said first layer to take into account a non-axisymmetric geometry of said casing.

11. The property gradient coating as claimed in claim 1, wherein said abradable material is a solvent-free thixotropic mixture consisting of a polymer base and a cross-linking agent in a weight ratio of polymer base to cross-linking agent of between 1:1 and 2:1, and a flow facilitating component present between 5 and 15% by weight of the total weight of said thixotropic mixture.

12. The property gradient coating as claimed in claim 11, wherein said first, second and third thermosetting materials consist of said abradable material.

13. The property gradient coating as claimed in claim 1, wherein said casing is a turbomachine fan casing of woven composite material.

\* \* \* \* \*